United States Patent
Harvey et al.

(10) Patent No.: US 8,660,709 B2
(45) Date of Patent: *Feb. 25, 2014

(54) VEHICLE SECURITY SYSTEM AND METHOD

(75) Inventors: John Harvey, San Diego, CA (US);
Thomas F. Doyle, San Diego, CA (US);
Michael L. Segal, Carlsbad, CA (US)

(73) Assignee: Omnitracs, Inc., San Diego, CA (US)

( * ) Notice: Subject to any disclaimer, the term of this patent is extended or adjusted under 35 U.S.C. 154(b) by 1304 days.

This patent is subject to a terminal disclaimer.

(21) Appl. No.: 10/674,041

(22) Filed: Sep. 29, 2003

(65) Prior Publication Data

US 2004/0059471 A1    Mar. 25, 2004

Related U.S. Application Data

(62) Division of application No. 10/217,393, filed on Aug. 12, 2002, now abandoned.

(51) Int. Cl.
*G06F 17/00* (2006.01)

(52) U.S. Cl.
USPC ........ 701/1; 701/36; 701/43; 701/45; 701/49; 340/425.5; 340/426.1; 340/426.11; 340/426.13; 340/426.3

(58) Field of Classification Search
USPC .............. 701/1, 2, 45, 46, 36, 49; 340/425.5, 340/426, 427, 457, 463, 5.2, 5.21, 5.22, 340/5.23, 5.24, 5.51, 5.52, 5.53, 5.54, 5.55, 340/5.64, 5.65, 5.66, 5.67, 5.8, 5.81, 5.82, 340/5.83, 5.84, 5.85, 825.36, 5.1, 5.72, 340/426.1, 426.13, 436.14; 307/10.1, 10.2, 307/10.3, 10.5
See application file for complete search history.

(56) References Cited

U.S. PATENT DOCUMENTS

| | | | | |
|---|---|---|---|---|
| 4,067,411 A | * | 1/1978 | Conley et al. | 180/169 |
| 4,550,402 A | * | 10/1985 | Gable et al. | 370/438 |
| 4,897,630 A | * | 1/1990 | Nykerk | 340/426.25 |
| 5,003,317 A | * | 3/1991 | Gray et al. | 342/457 |

(Continued)

FOREIGN PATENT DOCUMENTS

| | | |
|---|---|---|
| EP | 0 387 581 B1 | 2/1990 |
| EP | 0387581 A2 | 9/1990 |
| EP | 0 680 859 B2 | 3/1995 |
| EP | 0680859 A2 | 11/1995 |

OTHER PUBLICATIONS

International Search Report—PCT/US2003/025413, International Search Authority—European Patent Office—Jan. 16, 2004.

(Continued)

*Primary Examiner* — Khoi Tran
*Assistant Examiner* — Jonathan L Sample
(74) *Attorney, Agent, or Firm* — Arent Fox LLP

(57) ABSTRACT

A method and apparatus for validating a vehicle operator. In one embodiment, an apparatus comprises an input device for allowing entry of vehicle operator identification information, a transceiver for transmitting a message and receiving a response to the message, an interface for allowing a processor to communication with a vehicle sub-system, and a processor connected to the input device, the transceiver, and the interface, the processor for receiving the vehicle operator identification information from the input device, for generating the message comprising the vehicle operation identification information and providing the message to the transceiver, for receiving the response from the transceiver and for controlling the vehicle sub-system, via the interface, based on the response.

50 Claims, 5 Drawing Sheets

(56) References Cited

U.S. PATENT DOCUMENTS

| | | | |
|---|---|---|---|
| 5,519,260 A * | 5/1996 | Washington | 307/10.5 |
| 5,660,246 A | 8/1997 | Kaman | |
| 5,715,905 A | 2/1998 | Kaman | |
| 5,874,889 A * | 2/1999 | Higdon et al. | 340/426.36 |
| 5,880,679 A * | 3/1999 | Lenart et al. | 340/5.6 |
| 5,917,405 A * | 6/1999 | Joao | 340/426.17 |
| 5,991,308 A * | 11/1999 | Fuhrmann et al. | 370/395.53 |
| 6,009,075 A * | 12/1999 | Roberts et al. | 370/219 |
| 6,108,591 A * | 8/2000 | Segal et al. | 701/1 |
| 6,122,580 A * | 9/2000 | Autermann | 701/49 |
| 6,144,989 A * | 11/2000 | Hodjat et al. | 709/202 |
| 6,154,658 A * | 11/2000 | Caci | 455/466 |
| 6,188,667 B1 * | 2/2001 | Roberts et al. | 370/219 |
| 6,188,939 B1 | 2/2001 | Morgan et al. | |
| 6,232,874 B1 * | 5/2001 | Murphy | 340/426.19 |
| 6,397,057 B1 * | 5/2002 | Malackowski et al. | 455/414.1 |
| 6,542,076 B1 * | 4/2003 | Joao | 340/539.14 |
| 6,542,795 B2 * | 4/2003 | Obradovich et al. | 701/1 |
| 6,549,130 B1 * | 4/2003 | Joao | 340/539.14 |
| 6,587,040 B2 * | 7/2003 | Seto | 340/426.1 |
| 6,850,153 B1 * | 2/2005 | Murakami et al. | 340/425.5 |
| 6,850,252 B1 * | 2/2005 | Hoffberg | 715/716 |
| 6,940,847 B1 * | 9/2005 | Glitho et al. | 370/352 |
| 7,010,682 B2 * | 3/2006 | Reinold et al. | 713/155 |
| 7,109,625 B1 | 9/2006 | Jore et al. | |
| 2002/0116350 A1 | 8/2002 | Hodjat et al. | |
| 2002/0121969 A1 * | 9/2002 | Joao | 340/425.5 |
| 2002/0140545 A1 * | 10/2002 | Nietupski et al. | 340/5.72 |
| 2002/0156555 A1 * | 10/2002 | Obradovich et al. | 701/1 |
| 2002/0163449 A1 * | 11/2002 | Flick | 340/988 |
| 2003/0027555 A1 * | 2/2003 | Malackowski et al. | 455/414 |
| 2003/0033175 A1 * | 2/2003 | Ogura et al. | 705/5 |
| 2003/0034873 A1 * | 2/2003 | Chase et al. | 340/5.2 |
| 2003/0193404 A1 * | 10/2003 | Joao | 340/825.71 |
| 2003/0206102 A1 * | 11/2003 | Joao | 340/539.1 |
| 2003/0231550 A1 * | 12/2003 | Macfarlane | 367/198 |
| 2004/0008103 A1 * | 1/2004 | Kady et al. | 340/5.52 |
| 2004/0010358 A1 * | 1/2004 | Oesterling et al. | 701/49 |
| 2004/0017281 A1 * | 1/2004 | Dix | 340/5.61 |
| 2004/0181327 A1 * | 9/2004 | Tsosie | 701/36 |
| 2004/0204795 A1 * | 10/2004 | Harvey et al. | 701/1 |
| 2004/0220807 A9 * | 11/2004 | Tamir et al. | 704/246 |
| 2009/0276120 A1 | 11/2009 | Harvey et al. | |

OTHER PUBLICATIONS

Dakroury, Y. et al.: "Specification and validation of a distributed transaction processing facility for the MMS applications," 1995 INRIA/IEEE Symposium on Emerging Technologies and Factory Automation, 1995. ETFA '95, Proceedings., vol. 2; pp. 465-473; doi: 10.1109/ETFA.1995.496687.

Kim, K.H. et al. "Distributed Object-Oriented Real-Time Simulation of Ground Transportation Networks with the TMO Structuring Scheme," The Twenty-Third Annual International Computer Software and Applications Conf., 1999. COMPSAC '99. Proceedings. pp. 130-138; doi: 10.1109/CMPSAC.1999.812690.

Park, Y. et al: "Multi-phased development of a real-time control system and its validation through real-time simulation," TENCON 99. Proceedings of the IEEE Region 10 Conference, vol. 1; pp. 363-366; (1999), doi: 10.1109/TENCON.1999.818426.

West, C. H. "General Technique for Communications Protocol Validation," IBM Journal of Research and Development vol. 22 , No. 4; (Jul. 1, 1978), pp. 393-404; doi: 10.1147/rd.224.0393.

Barber, K.S et al., "Tool support for systematic class identification in object-oriented software architectures", Technology of Object-Oriented Languages and Systems, 2000. TOOLS-Pacific 2000. Proceedings. 37th International Conference on Digital Object Identifier: 10.1 109ITOOLS.2000.891360; Publication Year: 2000 , pp. 82-93.

Le Hegarat- Mascle, S et al., "Application of Dempster-Shafer evidence theory to unsupervised classification in multisource remote sensing", Geoscience and Remote Sensing, IEEE Transactions on; vol. 35 , Issue: 4 Digital Object Identifier: 10.1 109136.602544; Publication Year: 1997 , pp. 1018-1031.

Zio E., et al., "Complex Networks Vulnerability: A Multiple-Objective Optimization Approach", Reliability and Maintainability Symposium, 2007. RAMS '07. Annual; Digital Object Identifier: 10.1 109IRAMS.2007.328119 Publication Year: 2007 , pp. 196-201.

* cited by examiner

VEHICLE SECURITY SYSTEM AND METHOD

CROSS-REFERENCE TO RELATED APPLICATIONS

The present Application for Patent is a divisional and claims priority to patent application Ser. No. 10/217,393 entitled "Vehicle Security System and Method" filed Aug. 12, 2002 now abandoned, and assigned to the assignee hereof and hereby expressly incorporated by reference herein

BACKGROUND

I. Field of the Invention

The present invention relates to the field of vehicle security. More specifically, the present invention relates to a method and apparatus for providing vehicle security using a vehicle-based or host-based system to control vehicle access and functionality.

II. Description of the Related Art

Anti-theft and/or theft-deterrent devices for motor vehicles are known, in the prior art, for preventing or thwarting the theft of motor vehicles. These known devices may be of the active or passive variety and are typically available in many forms (i.e. steering wheel locks, hood locks, ignition system cut-off devices, alarms, etc.). In some cases, these devices may be of a very simple design, while in other cases, they may be of a more sophisticated design. However, as is well known, these known anti-theft and/or theft-deterrent devices and systems may be easily defeated by car thieves, and especially, by professional car thieves. Experience has shown that even the most sophisticated of anti-theft and/or theft-deterrent devices may be defeated by an experienced, and determined, vehicle thief.

Some prior art theft-deterrent systems prevent movement of a vehicle using an electronic control system. The electronic control system typically will not allow the vehicle to start unless a pre-assigned passcode is entered into the electronic control system by a vehicle operator. The passcode entered by the vehicle operator is compared to a passcode that is stored in a memory as part of the electronic control system. If the two passcodes match, the vehicle is enabled and normal operation of the vehicle ensues. However, if the two passcodes do not match, the vehicle is prevented from starting or the vehicle is prevented from exceeding a certain low-speed threshold.

One problem with the aforementioned theft-deterrent system is that it is difficult to manage. Often, it is necessary to physically access the electronic control system to change the passcode stored within. This may be due to a number of reasons, but mainly if the password becomes known by one or more unauthorized parties. This may occur intentionally, in the case of a disgruntled driver, or unintentionally, by sloppy safekeeping practices. In other cases, over a long period of time, it may be assumed that the password has been compromised in some fashion.

Another problem with the electronic control system described above is that the consequence of entering an incorrect password is limited to a single event that is defined, usually, by the manufacturer of the electronic control system. In many cases, it would be desirable to allow a third party, such as a vehicle owner, to define what happens if an incorrect password is entered into the electronic control device.

What is needed is a theft-deterrent system that is easy to manage while also allowing vehicle owners more control over the consequences of an incorrect passcode access attempt.

SUMMARY

A method and apparatus for validating a vehicle operator. In one embodiment, an apparatus comprises an input device for allowing entry of vehicle operator identification information, and a memory for storing pre-defined identification information. A processor compares the pre-defined identification information to the vehicle operator identification information and generates a validation message based on the comparison, the validation message indicating whether or not the pre-defined identification information matched the vehicle operator identification information. Finally, a transceiver transmits the validation message to a remote location in response to the comparison.

Alternatively, an apparatus for validating a vehicle operator comprises an input device for allowing entry of vehicle operator identification information, a transceiver for transmitting and receiving messages, and an interface for allowing a processor to communicate with a vehicle sub-system. A processor connected to the input device, the transceiver, and the interface, is also included, the processor for receiving the vehicle operator identification information from the input device, for generating a message comprising the vehicle operator identification information and providing the message to the transceiver. The transceiver transmits the message to a remote location, wherein the processor is further for controlling operation of the vehicle by way of the interface until a response to the message is received by the transceiver.

Alternatively, an apparatus for validating a vehicle operator comprises an input device for allowing entry of vehicle operator identification information, a transceiver for transmitting a message in response to entry of the vehicle operator identification information and for receiving a response to the message, and an interface for allowing a processor to communicate with a vehicle sub-system. The processor is connected to the input device, the transceiver, and the interface, the processor for receiving the vehicle operator identification information from the input device, for generating the message comprising the vehicle operator identification information and providing the message to the transceiver, for receiving the response from the transceiver and for controlling the vehicle sub-system, via the interface, based on the response.

Alternatively, an apparatus for validating a vehicle operator comprises a transceiver for receiving a validation message from a vehicle and for transmitting a response to the validation message, and a processor for evaluating the validation message and for generating the response to the validation message, the response comprising instructions for controlling operation of the vehicle.

Alternatively, an apparatus for validating a vehicle operator comprises a signal-bearing medium tangibly embodying a program of machine-readable instructions for performing a method of validating a vehicle operator, executable by a digital processing apparatus, the method comprising operations of receiving vehicle operator identification information from a user interface, storing pre-defined identification information, and comparing the pre-defined identification information to the vehicle operator identification information. A validation message is generated based on the comparison, the validation message indicating whether or not the pre-defined identification information matched the vehicle operator identification information. Finally, transmitting the first message to a remote location in response to the comparison.

Alternatively, an apparatus for validating a vehicle operator comprises a signal-bearing medium tangibly embodying a program of machine-readable instructions for performing a method of validating a vehicle operator, executable by a digital processing apparatus, the method comprising operations of receiving vehicle operator identification information from a user interface, generating a validation message comprising the vehicle operator identification information, and transmitting the validation message to a remote location. Subsequently, receiving a response to the validation message, and controlling operation of a vehicle based on instructions contained in the response.

In another embodiment, a method for validating a vehicle operator comprises receiving a validation message from a vehicle, evaluating the validation message, generating a response to the validation message, the response comprising instructions for controlling operation of the vehicle, and transmitting the response to the vehicle.

BRIEF DESCRIPTION OF THE DRAWINGS

The features, advantages, and objects of the present invention will become more apparent from the detailed description as set forth below, when taken in conjunction with the drawings in which like referenced characters identify correspondingly throughout, and wherein.

DETAILED DESCRIPTION

Figure 1:
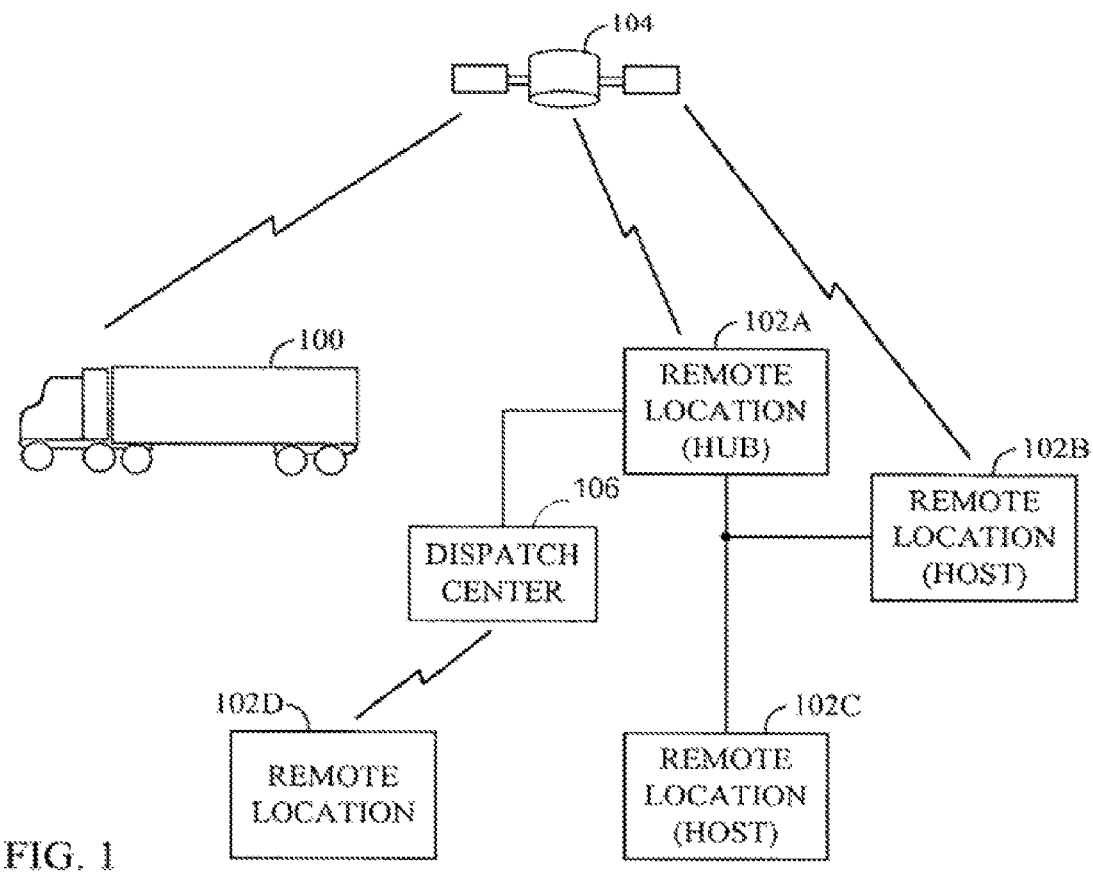
FIG. 1 illustrates a satellite-based wireless communication system in which the method and apparatus for validating vehicle operators is used.

FIG. 1 illustrates a based-based wireless communication system widely used in the trucking industry for allowing two-way communications between vehicle operators and third parties, such as a fleet management center, family members, governmental authorities, and so on. Although the method and apparatus for validating vehicle operators is described herein with respect to system a satellite-based communication system, it should be understood that any other wireless communication system could be used in the alternative, including cellular and PCS terrestrial communications, microwave communications, and so on. It should also be understood that the method and apparatus for validating vehicle operators could also be used to validate operators of a number of different types of vehicles, such as buses, aircraft, automobiles, watercraft, or any other machine in which operator validation is desired.

As used throughout this specification, the term "validation" or "validate" means to determine whether or not a vehicle operator is authorized to operate a vehicle. Also, as used throughout, the term "vehicle operator" means any person who attempts to become validated, whether that person is a vehicle operator, a vehicle passenger, a vehicle maintenance worker, and so on.

Referring now to FIG. 1, vehicle 100, in this example, comprises a tractor-trailer, commonly used in the long-haul trucking industry. Vehicle 100 comprises a mobile communication terminal (MCT, not shown) for communicating with a remote location 102a via satellite 104. Generally, the MCT resides onboard a tractor portion of vehicle 100, in one embodiment. In one embodiment, remote location 102a comprises a central processing center, otherwise known as a "hub" or "network management center (NMC) and serves as a central communication point between MCT-equipped vehicles and their respective dispatch centers, other designated office(s), shippers, consignees, governmental authorities, family members, and so on. For example, in FIG. 1, remote location 102a passes communications between remote host or remote location 102b and vehicle 100. Remote location 102b comprises a vehicle dispatch center which generally monitors and controls a fleet of vehicles 100.

Communications between remote location 102b and vehicle 100 may further be passed to one or more other remote locations, such as remote location (host) 102c. Remote location 102c comprises any number of interested third parties to communications between remote location 102b and vehicle 100. For example, remote location 102c could be a another designated office of remote location 102b, a shipper of goods being carried by vehicle 100, a consignee of goods being carried by vehicle 100, a governmental unit, a personal computer, and so on. Communications among remote locations 102a, 102b, and 102c may be carried out by any known communication techniques, including telephone, internet, dedicated lines, wireless links, and so on.

In addition to remote locations 102a, 102b, and 102c, remote location 102d is shown which comprises a mobile entity, such as an emergency vehicle (police car, fire truck, etc), an individual, an aircraft, etc. Generally, communications between a remote location 102a and remote location 102d are routed through a dispatch center 106 associated with remote location 102d. Communications between dispatch center 106 and remote location 102d may employ any well-known wireless communication method, such as cellular, satellite, RF, Land Mobile Radio (LMR), or others. Communications between dispatch center 106 and remote location 102a (or other remote locations 102) generally occur using landline communications, such as a telephone link, a fiber optic connection, the Internet, or others. Located onboard remote location 102d is a two-way wireless communication device which is able to send and receive information to and from one or more of the remote locations 102 or an MCT. Remote location 102d might, for example, receive information identifying a certain vehicle 100 that is not operating with a validated vehicle operator operating the vehicle. Remote location may then transmit one or more commands to vehicle 100/MCT, either directly to vehicle 100/MCT, or through dispatch center 106, to disable or impair the operation of vehicle 100.

In another embodiment, communications to and/or from vehicle 100 are transmitted directly to/from remote location 102b and/or 102c without being processed by a central communication center, such as remote location 102a.

The MCT located on vehicle 100 transmits and receives communications wirelessly using, in one embodiment, a satellite 104. In other embodiments, the MCT uses a terrestrial wireless communication system to communicate with remote location 102a, such as an analog or a digital cellular telephone system, an RF communication system, or a wireless data communication network, such as a cellular digital packet data (CDPD) network.

Figure 2:
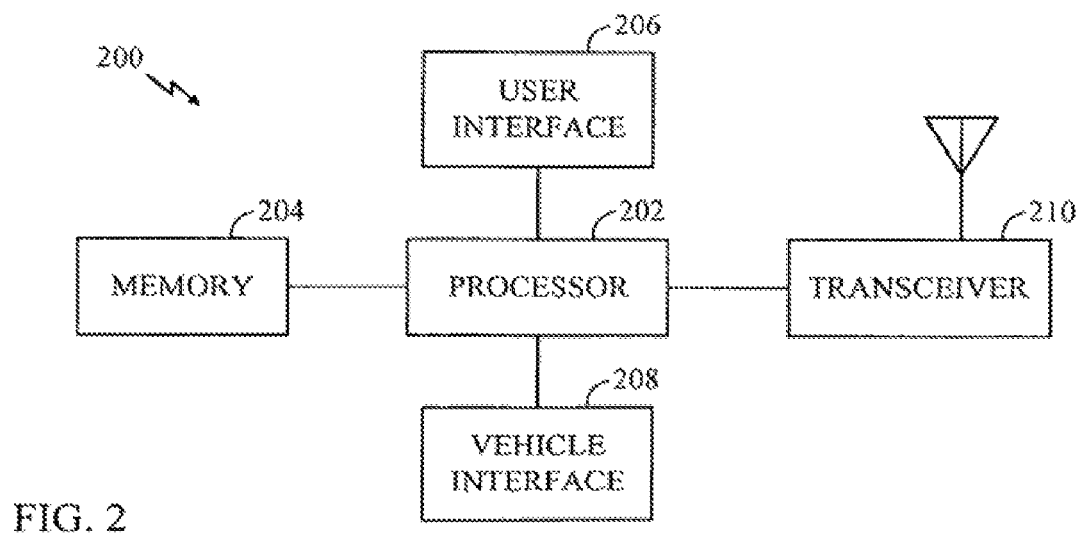
FIG. 2 is a functional block diagram of one embodiment of a mobile communication terminal used in the communication system of FIG. 1.

FIG. 2 is a functional block diagram of one embodiment of the MCT, discussed above, herein MCT 200. MCT 200 generally comprises a processor 202, a memory 204, a vehicle operator interface 206, and a vehicle interface 208. It should be understood that the functional blocks shown in FIG. 2 may be housed together in a single MCT unit, or they may be distributed in any combination throughout vehicle 100. For example, the transceiver 210 may or may not be incorporated into the physical structure of MCT 200.

Processor 202 generally comprises circuitry necessary for executing machine-readable instructions stored in memory 204. For example, processor 202 may comprise a microprocessor and supporting circuitry, such as the Intel 80×86 or Pentium series of microprocessors. Of course, other electronic processors could be used in the alternative. Memory 204 may comprise one or more signal-bearing mediums tangibly embodying one or more programs of machine-readable instructions executable by a digital processing apparatus, such as processor 202. Typically, memory 204 comprises one or more volatile and/or non-volatile memories, such as a read-only memory (ROM), random-access memory (RAM), electrically erasable programmable read-only memory (EEPROM), a hard drive, a floppy disk drive and floppy disk, or a flash memory. Memory 204 is used to store instructions relating to the operation of MCT 200 including instructions relating to communications with remote location(s) 102. For example, instructions may be stored relating to the detection of certain vehicle operating characteristics, such as the vehicle location, vehicle speed, engine RPM, load status, driver status, etc. Other information stored within memory 204 generally includes instructions for processor 202 to communicate with remote location(s) 102. Further, instructions may be stored for managing and controlling vehicle 100. For instance, if a validation is unsuccessful, instructions may be stored within memory 204 for impairing operation of vehicle 100. Each vehicle may have a distinct set of instructions stored within memory 204 for controlling vehicle 100 during pre-defined events.

Vehicle operator interface 206 allows a vehicle operator of MCT 200 to enter instructions into MCT 200, typically comprising a keyboard or keypad and a visual display device. Of course, vehicle operator interface 206 could alternatively comprise other types of interfaces, such as a microphone for entering audible commands, a pointing device such as a mouse, light pen, trackball, and/or a speaker for generating audible information to a vehicle operator. Other types of well-known devices could be used, either alternatively or in combination, with the devices just mentioned. For example, vehicle operator interface may, alternatively or in addition, comprise a biometric device or a card reader.

Vehicle interface 208 allows processor 202 to communicate with one or more electronic control units (ECUs) located onboard vehicle 100, either directly, or through one or more intermediary devices, such as an onboard computer (not shown). Vehicle interface 208 comprises a communication port such as a serial data port for communicating, for example, with an onboard computer. Alternatively, vehicle interface 208 comprises a port for interfacing to a vehicle data bus, such as a J1708 data bus commonly used in vehicles today. Examples of ECUs include a fuel regulator/cutoff switch, an ignition controller, an electronic transmission controller, a steering wheel locking mechanism, and a brake activation unit. Other examples of ECUs include electronic devices which provide operational information about vehicle 100 to processor 202. For example, these types of ECUs comprise a speed sensor, an RPM sensor, an odometer, or a location sensor such as a GPS receiver.

In modern vehicles, the ECUs may be interconnected by a data bus, such as a data bus as specified in SAE J1708, a commonly known communication standard. The data bus is connected to vehicle interface 208 so that communications may take place between processor 202 and the various ECUs connected to the data bus.

Transceiver 210 comprises circuitry to modulate information from processor 202 and convert the modulated information into high frequency signals suitable for wireless transmission. Similarly, transceiver 210 also comprises circuitry to convert received high frequency communication signals into signals suitable for demodulation and subsequent processing by processor 202.

A vehicle operator of MCT 200, typically an operator of vehicle 100, enters vehicle operator identification information into MCT 200 using vehicle operator interface 206, either prior to operating vehicle 100 or subsequently after initial use. The vehicle operator identification information typically comprises a passcode, such as a predefined vehicle operator name and password, although other types of information may be used to validate the vehicle operator, such as a social security number or, in general, a vehicle operator-defined numeric or alpha-numeric code used in combination (or not) with a password.

Alternatively, or in conjunction with one or more I/O devices just described, vehicle operator interface 206 comprises a biometric device, such as a fingerprint reader, retinal scanner, or voice recognition device. A vehicle operator of MCT 200 then identifies himself/herself to MCT 200 by providing the necessary biological identification information to vehicle operator interface 206. In this case, the vehicle operator identification information comprises the biometric information.

Figure 3:
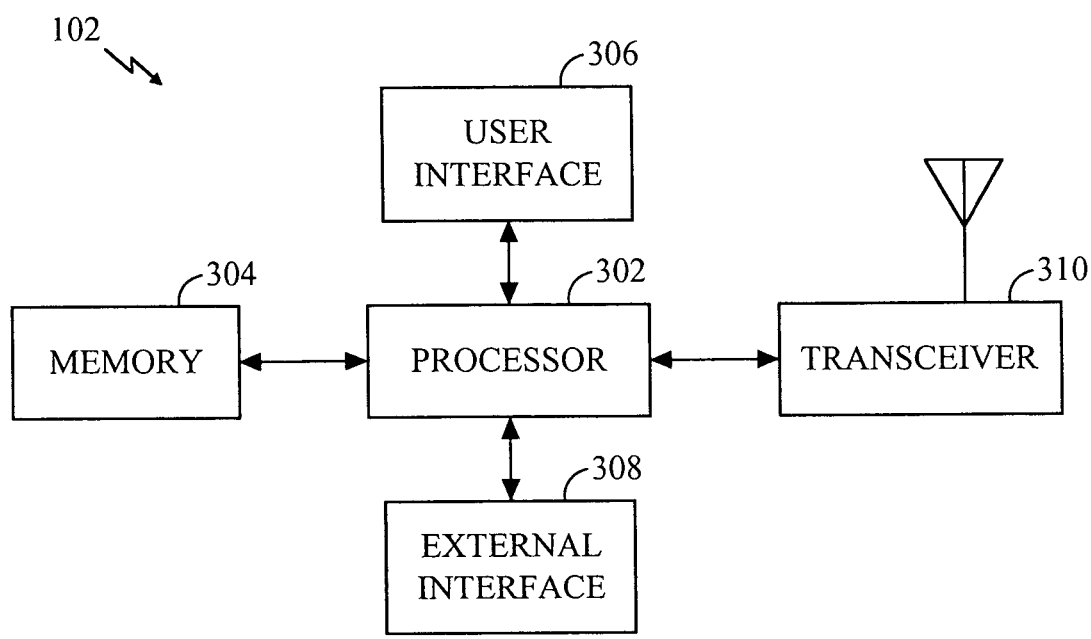
FIG. 3 illustrates a functional block diagram of an apparatus for validating vehicle operators at a remote location.

FIG. 3 illustrates a functional block diagram of an apparatus located at remote location 102 comprising a processor 302, a memory 304, a vehicle operator interface 306, a transceiver 310, and an external interface 308. Remote location could be a network operations center or hub, a vehicle dispatch center, a law enforcement center, a governmental entity, an individual, a vehicle, or virtually any entity interested in the status of vehicle 100.

Processor 302 generally comprises circuitry necessary for executing executable computer instructions stored in memory 304. For example, processor 302 may comprise a microprocessor and supporting circuitry, such as the Intel 80×86 or Pentium series of microprocessors. Of course, other electronic processors could be used in the alternative. Memory 304 may comprise one or more volatile and/or non-volatile memories, such as a read-only memory (ROM), random-access memory (RAM), electrically erasable programmable read-only memory (EEPROM), a hard drive, a floppy disk drive and floppy disk, or a flash memory. Memory 304 is used to store information relating to the operation of remote location 102 and, more specifically, information relating to communications to vehicle 100. For example, one or more databases could be stored within memory 304, each database relating to a fleet of vehicles and containing information pertinent to each vehicle such as license plate number, vehicle identification number, vehicle type, vehicle maintenance schedules, vehicle location, vehicle operational parameters such as speed, RPM, fuel information, oil pressure, load status, etc. Other information stored within memory 304 generally includes executable computer instructions for processor 302 to communicate with vehicle 100 and one or more remote locations 102. Further, instructions may be stored for managing and controlling vehicle 100. For instance, if a validation is unsuccessful, instructions may be stored within memory 304 for impairing operation of vehicle 100. Each vehicle may have a distinct set of instructions stored within memory 304 for controlling vehicle 100 during pre-defined events.

Vehicle operator interface 306 allows a vehicle operator to enter instructions into processor 302, typically comprising a keyboard or keypad and a visual display device. Of course, vehicle operator interface 306 could alternatively comprise other types of interfaces, such as a microphone for entering audible commands, a pointing device such as a mouse, light pen, trackball, and/or a speaker for generating audible information to a vehicle operator. Other types of well-known devices could be used, either alternatively or in combination, with the devices just mentioned.

External interface 308 allows processor 302 to communicate with one or more remote locations 102. External interface 308 comprises one or more devices for allowing various forms of two-way communications to occur between the various remote locations. Examples of external interface comprise a telephonic interface, an optical interface, a data interface (for example, a T1, T3, or the like), an internet interconnection device such as a router, a wireless transceiver, or a combination of these devices, as well as others.

Transceiver 310 comprises circuitry to modulate information from processor 302 and convert the modulated information into high frequency signals suitable for wireless transmission. Similarly, transceiver 310 also comprises circuitry to convert received high frequency communication signals into signals suitable for demodulation and subsequent processing by processor 302.

Figure 4:
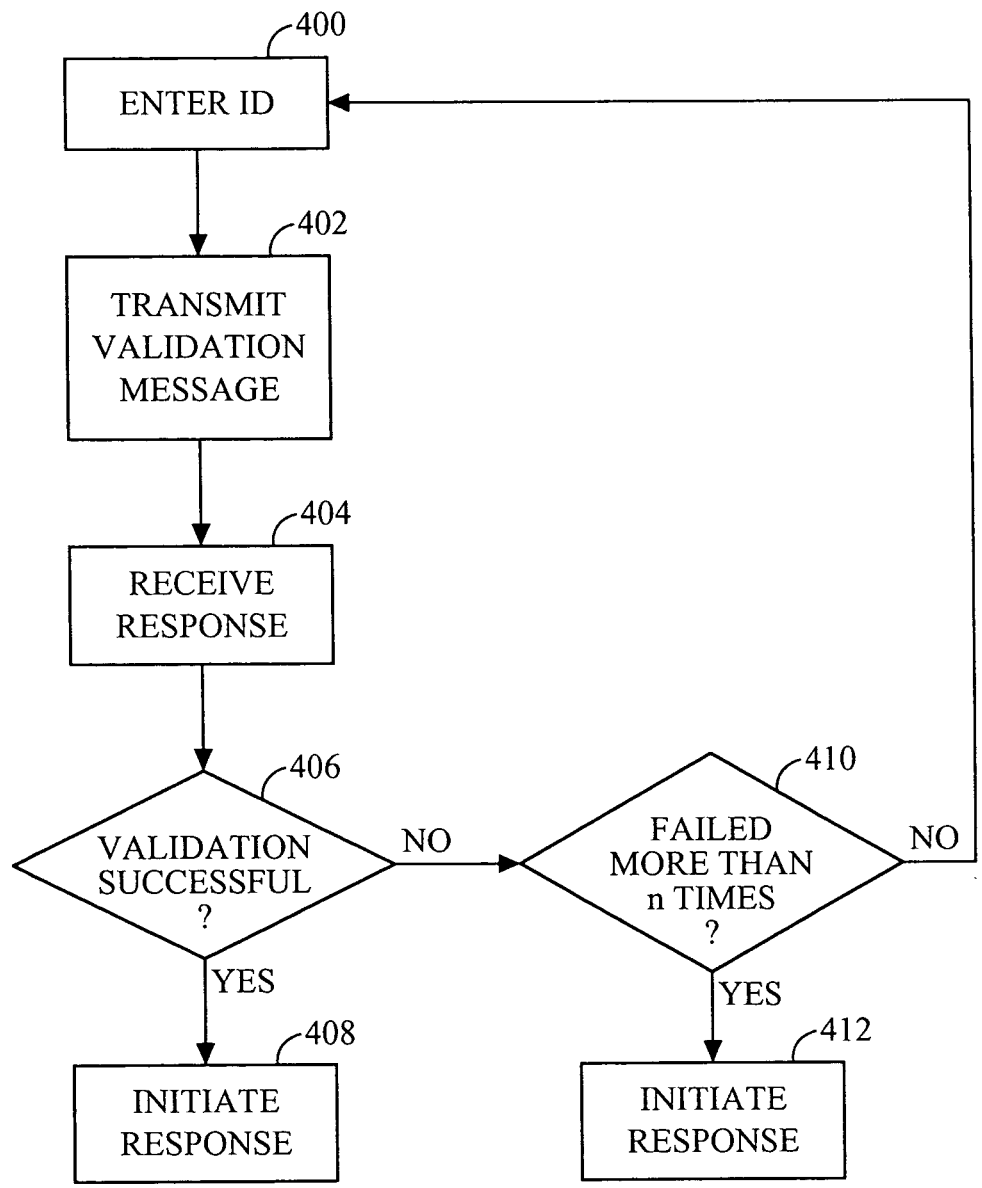
FIG. 4 is a flow diagram illustrating one method for validating a vehicle operator.

FIG. 4 is a flow diagram illustrating a method for validating a vehicle operator. The method may be embodied as a set of machine-readable instructions executable by a digital processing apparatus and stored in memory 204. In step 400, a vehicle operator of MCT 200 or operator of vehicle 100 identifies himself/herself by entering vehicle operator identification information into MCT 200 using vehicle operator interface 206. As explained above, the vehicle operator identification information may comprise a vehicle operator name and password, biometric information, or other information. The vehicle operator identification information is provided to processor 202, where the it is formatted for transmission over the air using transceiver 210, called a validation message herein, and shown in FIG. 4 as step 402. The validation message is formatted to include an indication that requests a remote location 102 to perform a validation on the supplied vehicle operator identification information.

In one embodiment, vehicle 100 is enabled whether a vehicle operator is currently validated or not. If a vehicle operator does not attempt to validate himself/herself to MCT 200 prior to vehicle operation, vehicle 100 may be allowed to operate for a pre-determined amount of time, distance, or some other criteria. Alternatively, a vehicle operator of vehicle 100 may be allowed to start vehicle 100, but not move vehicle 100 or otherwise operate it without validating himself/herself to MCT 200. For example, if a vehicle operator of vehicle 100 begins driving without validating himself to MCT 200, he may be permitted to operate vehicle 100 for a distance of one mile before MCT 200 begins a sequence which at least requests that the vehicle operator validate himself to MCT 200, i.e., to enter vehicle operator identification information. The request is generally issued through vehicle operator interface 206. If the vehicle operator fails to validate himself to MCT 200 within a predetermined time period after operating vehicle 100 for one mile, MCT 200 begins a sequence which disables or impairs operation of vehicle 100, as described later herein. If the vehicle operator of vehicle 100 then validates himself/herself to MCT 200 within a pre-determined time period after the request to validate has been given, vehicle 100 will continue to operate normally.

In any case, at some time after the validation message is transmitted in step 402, a response to the validation message is received by MCT 200, shown as step 404. The response contains an indication of whether validation of the vehicle operator was successful or not. Validation is performed at a remote location from vehicle 100, such as at remote location 102a, 102b, 102c, etc. In step 406, processor 202 determines whether validation was successful or not. If processor 202 determines that validation was successful, as determined in step 406, a response is initiated by processor 202, as shown in step 408. The response comprises one or more instructions for processor 202 to perform to control operation of vehicle 100. Typically, processor 202 uses the instructions to control one or more vehicle electronic control units (ECUs) connected through a data bus, which in turn is connected to vehicle interface 208. In one embodiment, the instructions are stored in memory 204. In another embodiment, the instructions are provided within the reply message sent by remote location 102.

For example, the instructions may allow processor 202 to instruct a fuel control ECU to allow fuel to pass normally from the fuel tank to one or more fuel injectors, carburetors, or the like. Alternatively, or in addition, the instructions include processor 202 sending one or more commands to enable one or more vehicle electronic subsystems, such as a vehicle ignition, a braking system (brakes would be released in this case), an electronic or mechanical clutch or gearshift controller, or a steering wheel control system. Of course, other vehicle systems could be enabled by processor 202, either alternatively or in addition, to the examples just listed. In an embodiment where the vehicle is able to be operated normally for a predetermined time, distance, or speed prior to validation, processor 202 simply allows the various vehicle sub-systems/ECUs to perform normally, and cancels any actions that would normally be taken if one or more of the predetermined time, distance, or speed is exceeded.

If validation was unsuccessful, as determined in step 406, step 410 is performed in which processor 202 determines whether validation has been attempted more than a predetermined number of times, or n times, for a particular vehicle operator. For example, n might be chosen as "3" in which case processor 202 determines whether validation has been attempted more than 3 times or not. If validation has been attempted less than 3 times, the vehicle operator is generally prompted to re-enter the vehicle operator identification information, as shown back in step 400. The validation process at remote location 102 is then repeated.

If validation has been attempted more than 3 times, as determined by processor 102 in step 410, processing continues to step 412 in which a response is implemented. A response might include notifying the vehicle operator that the validation attempt failed and that no further validation attempts will be permitted. Alternatively, or in addition, the response might include processor 202 sending one or more commands through vehicle interface 208 to one or more ECUs or other vehicle control systems to prevent or limit movement, or otherwise impair operation of vehicle 100. For example, a fuel cut-off switch might be activated, a vehicle braking system activated, or an ignition system might be disabled. Further, processor 202 could take other actions not necessarily related to preventing or impairing vehicle movement. Such other actions might include activating a vehicle horn, headlights, taillights, or interior lights, locking or unlocking one or more doors, and so on.

Instructions defining the actions taken upon a failed validation attempt may be predetermined and stored in memory 204, or they may be contained in the response message from remote location 102. By allowing the failure response to be defined by remote location 102, greater flexibility is achieved in determining what to do in case of a failed validation attempt. For example, in certain instances, a vehicle owner may wish to change the various combinations of responses to successful or unsuccessful validation attempts from time to time.

Figure 5:
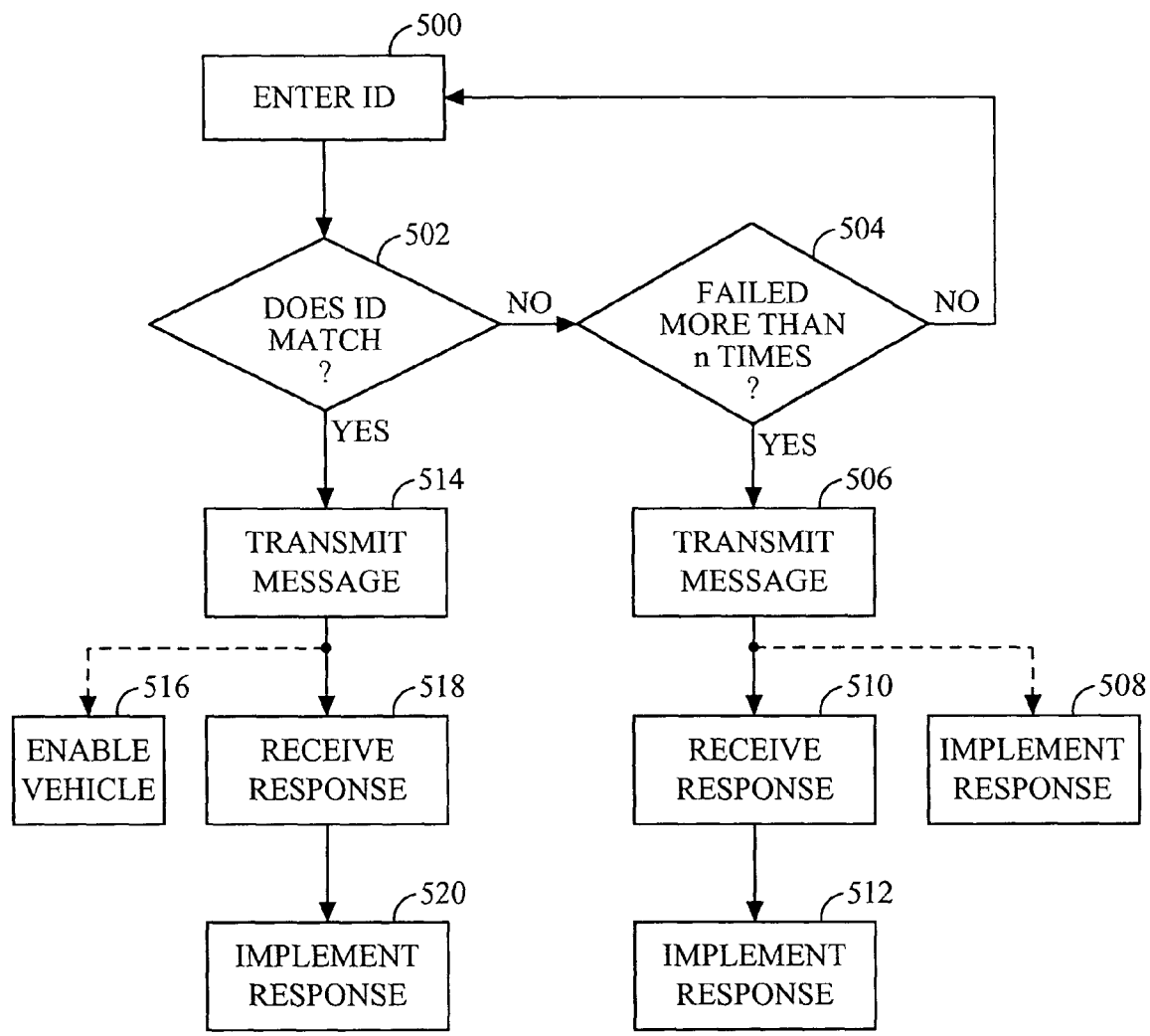
FIG. 5 is a flow diagram illustrating an alternative method for validating vehicle operators.

FIG. 5 is a flow diagram illustrating an alternative method for validating vehicle operators. In step 500, a vehicle operator identifies himself/herself to MCT 200 by entering vehicle operator identification information into MCT 200 using vehicle operator interface 206. As explained above, the vehicle operator identification information may comprise a vehicle operator name and password, biometric information, or other information. The vehicle operator identification information is provided to processor 202, where it is compared to pre-defined identification information stored in memory 204, as shown in step 502. The pre-defined identification information is generally loaded into memory 204 by authorized personnel of vehicle 100 at a time prior to a validation attempt by a vehicle operator. The pre-defined identification information comprises any information necessary to validate the identity of a vehicle operator attempting to operate vehicle 100. For example, the pre-defined identification information could comprise a vehicle operator name and password, a social security number or, in general, a pre-defined numeric or alpha-numeric code used in combination (or not) with a password. Pre-defined identification information may alternatively, or in combination, comprise electronic information relating to one or more biometric parameters corresponding to a potential vehicle operator. Such pre-defined electronic biometric information may comprise information relating to a fingerprint, retina, or voice of a potential vehicle operator, among others.

If the vehicle operator identification information does not match the pre-defined identification information stored in memory 204, processing continues to step 504, where processor 202 determines whether the validation has been attempted more than a predetermined number of times, or n times, for any given vehicle operator. For example, n might be chosen as "3" in which case processor 202 determines whether validation has been attempted more than 3 times or not. If validation has been attempted less than 3 times, the vehicle operator is prompted to re-enter the vehicle operator identification information, as shown back in step 500.

If validation has been attempted more than n times, a message is transmitted by MCT 200 to one or more remote locations 102 that informs remote location(s) 102 that a vehicle operator has attempted to validate more than the pre-determined number of times allowed, possibly indicating an unauthorized attempt to operate vehicle 100. The message generally comprises the vehicle operator identification information as provided by the vehicle operator during attempted validation. This is shown as step 506 in FIG. 5.

As a result of exceeding the maximum allowed validation attempts and subsequent transmission of the message as described in step 506, a number of potential actions may take place. For example, after the message in step 506 is transmitted, processor 202 may implement a response as shown as step 508. Such a response may include processor 102 sending one or more commands through vehicle interface 208 to one or more ECUs or other vehicle control systems to prevent or limit movement or operation of vehicle 100. For example, a fuel cut-off switch might be activated, a vehicle braking system activated, or an ignition system might be disabled.

Alternatively, processor 102 could wait until a response to the message transmitted in step 506 is received, as shown in step 510. The response would instruct processor 102 to take specific action(s) as directed by remote location 102. In this way, a response to an unsuccessful validation can be determined by each owner of vehicle 100. In step 512, the action(s) as denoted by the response is implemented by processor 202. As described earlier, the response may instruct processor 202 to send one or more commands through vehicle interface 208 to one or more ECUs or other vehicle control systems to prevent or limit movement or operation of vehicle 100. For example, a fuel cut-off switch might be activated, a vehicle braking system activated, or an ignition system might be disabled. Alternatively, or in addition to the actions described above, processor 102 could take other actions not necessarily tied to preventing vehicle movement. Such other actions might include activating a vehicle horn, headlights, taillights, or interior lights, locking or unlocking one or more doors, and so on.

Back in step 502, if the vehicle operator identification information matches the pre-defined identification information stored in memory 204, processing continues to step 514, where processor 202 transmits a message to remote location 102 informing remote location 102 of the successful validation. As a result of the successful validation in step 502, processor 202 may enable various vehicle functions, as show as step 516. This may include processor 202 sending one or more commands through vehicle interface 208 instructing one or more ECUs or other electronic or electromechanical vehicle systems to allow normal operation of vehicle 100. Examples of such instructions may include instructions for controlling a fuel control ECU to allow fuel to pass normally from the fuel tank to one or more fuel injectors, carburetors, or the like. Other examples include commands to enable a vehicle ignition, release one or more brakes, enable a clutch, or unlock a steering wheel. Of course, other vehicle systems could be enabled by processor 202, either alternatively or in addition, to the examples just listed.

Alternatively, instead of acting unilaterally, processor 202 awaits instructions from remote location 102 after transmitting the message as described in step 514, indicating a successful validation. In this example, processor 202 waits for a response to the message transmitted in step 514 (shown as step 518), the response comprising instructions for processor 202 to implement. Generally, these instructions enable one or more ECUs or other vehicle subsystems to allow vehicle 100 to operate normally. In step 520, processor 202 implements the instructions comprising the response, such as enabling a fuel control ECU, enabling an ignition control ECU, releasing one or more brakes, enabling a clutch, or unlocking a steering wheel. Of course, other variations are possible, as detailed above.

Figure 6:
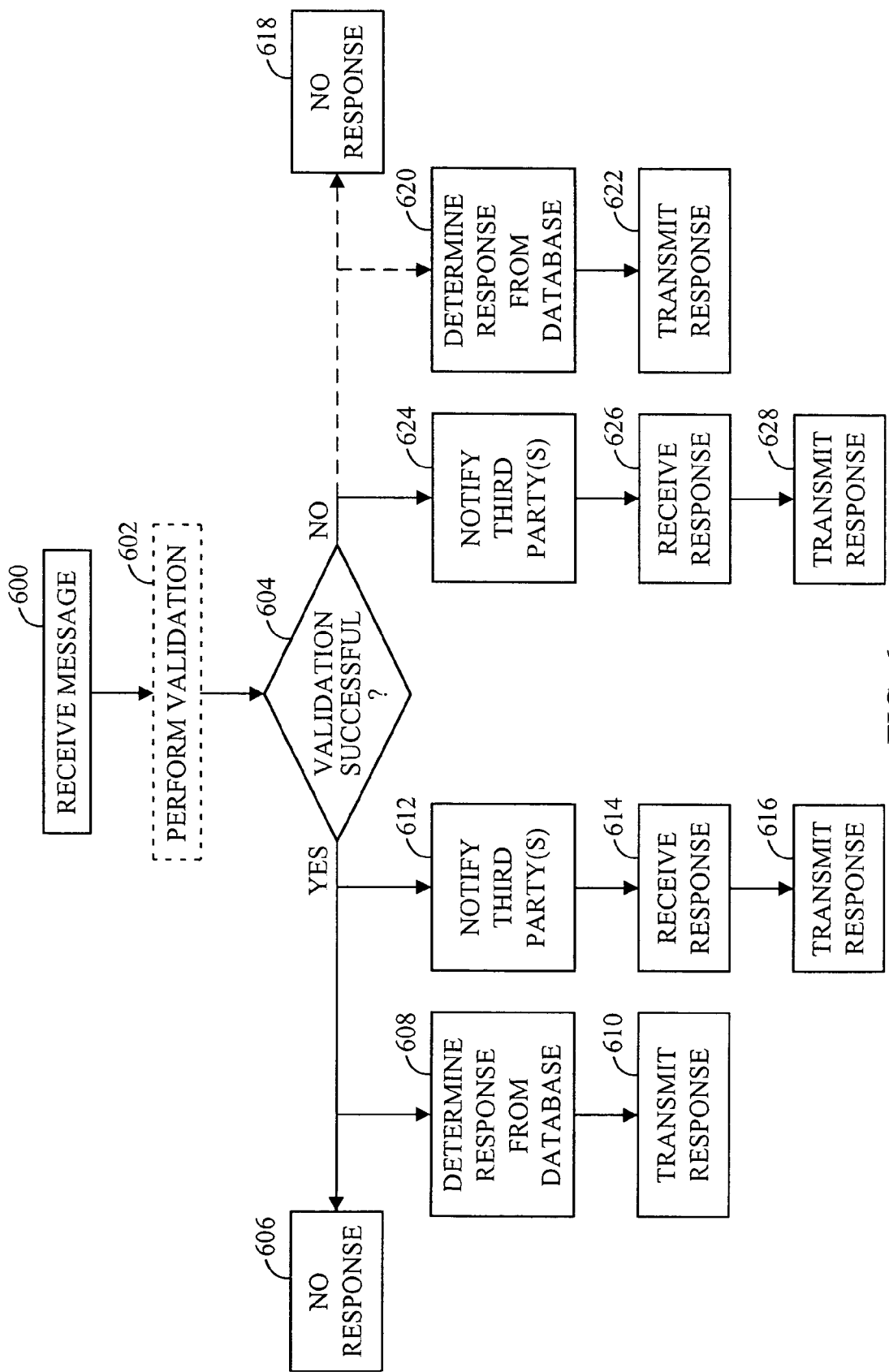
FIG. 6 is a flow diagram illustrating a method for validating vehicle operators that may be used in conjunction with the methods described in FIG. 4 and FIG. 5.

FIG. 6 is a flow diagram illustrating a method for validating vehicle operators that may be used in conjunction with the methods described in FIG. 4 and FIG. 5. The method of FIG. 6 describe the steps taken at remote location 102a when a validation message is received from vehicle 100 with respect to validating a vehicle operator of vehicle 100.

In step 600, a validation message is received from vehicle 100 and evaluates the validation message. The validation message may comprise vehicle operator identification information of a vehicle operator attempting to operate vehicle 100 and a request to validate the vehicle operator associated with the identification information, or it may comprise status information, indicating either a successful validation onboard vehicle 100 or not. If the validation message comprises vehicle operator identification information and a request to perform validation, step 602 is performed. It should be understood that in another embodiment, the request to perform validation is implicit in the validation message itself.

In step 602, processor 302 performs a validation using information contained in the validation message. The validation message comprises vehicle operator identification information that was provided by a vehicle operator attempting to operate vehicle 100. The vehicle operator identification information comprises any information necessary to identify the vehicle operator, including a vehicle operator name and password, any alpha-numeric code, biometric information, or any other information able to identify the vehicle operator. Processor 302 compares the vehicle operator identification information in the validation message to pre-defined identification information stored in memory 304. In one embodiment, a vehicle operator may attempt validation a pre-determined number of times, in which case steps 600 and 602 are repeated a predetermined number of times if validation is unsuccessful.

In another embodiment, rather than provide validation at remote location 102a, processor 302 forwards the vehicle operator identification information to another remote location, such as remote location 102b, for validation by remote location 102b. In this embodiment, a status message is returned from remote location 102b to remote location 102a, indicating a successful validation or not. Validation is performed generally in the same manner described in the embodiment where validation is performed at remote location 102a.

In step 604, processor 302 determines whether the validation in step 602 was successful, or, in the case of a status message, whether the status message indicated that a vehicle operator of vehicle 100 was successfully validated or not.

If validation was successful, a number of possible actions are taken by processor 302. Some of the actions generally may be performed in any order, combined with other described actions in other alternative embodiments, or simply not performed at all. In general, the actions are alterable by an owner of vehicle 100, a dispatch center, or other remote location 102 at any time. For example, in response to a successful validation, a dispatch center associated with vehicle 100 might want to change the response from enabling vehicle operation to enabling vehicle operation plus flashing the interior lights of vehicle 100 one time.

If validation was successful in step 604, no action is taken by processor 302 in one embodiment, as shown in step 606. This generally occurs in the case of receipt of a validation messages that simply contains status information.

In another embodiment, processor 302 consults memory 304 to determine an appropriate response to successful validation, as shown in step 608. Possible responses include controlling one or more electronic or electro-mechanical devices onboard vehicle 100 so that vehicle 100 may be operated by the vehicle operator that has been successfully validated. Alternatively, or in addition, a response message directed to the validated vehicle operator may be issued. The response message may be pre-defined or it may contain other variable information that may vary over time. The variable information may be stored or deleted by one or more authorized remote stations 102 via external interface 308 and processor 302. The variable information may comprise a voice or a text message (i.e., email) waiting to be transmitted to a particular vehicle operator or vehicle.

For example, variable information may include information pertinent to the particular validated vehicle operator, vehicle 100, a route of travel, or an itinerary associated with vehicle 100 or the validated vehicle operator. A dispatch center 102b may wish to notify a vehicle operator ABC that his spouse wants him to call home and also to perform a safety inspection on vehicle 100. A text message is sent from dispatch center 102b to remote location 102a to store this variable information into memory 304. When vehicle operator ABC is validated at a subsequent time, processor 302 consults memory 304 to determine if there is any variable information waiting to be sent to vehicle operator ABC. In this case, processor 302 causes a response message to be transmitted to vehicle 100, informing him to call home and perform the vehicle inspection.

In step 610, a response to the status message/validation message is transmitted to vehicle 100 which includes the response to control vehicle functionality and/or variable information, as described above. In another embodiment, a second response is sent to an entity other than vehicle 100, for example, any number of remote locations 102. The second response may include any information pertinent to the successful validation of the vehicle operator, for instance, an identification of the vehicle operator, the time of attempted validation, the time of successful validation, the location of vehicle 100 when validation or attempted validation has taken place, and so on.

In another embodiment, after a successful validation, in step 612, a notification of the successful validation is sent by processor 302 using external interface 308, to one or more third parties, such as one or more remote locations 102. The notification may contain information related to the successful validation, such as an identification of the vehicle operator, the time of attempted validation, the time of successful validation, the location of vehicle 100 when validation or attempted validation has taken place, and so on. The notification may, alternatively or in addition, comprise a request to send a response from one or more third parties, pertaining to one or more actions or messages to be transmitted to vehicle 100. This allows a third party, such as a dispatch center associated with vehicle 100, to dictate specific actions to vehicle 100 when a successful validation notification is received. Such actions may include enabling one or more vehicle subsystems or ECUs necessary to the operation of vehicle 100.

At a subsequent time to sending the notification in step 612, a response to the notification is received by processor 302 from one or more third parties through interface 308, as shown in step 614. The response generally comprises instructions to vehicle 100 which enable one or more vehicle subsystems or ECUs necessary to the operation of vehicle 100. The response may also comprise voice or text messages or other information directed to the vehicle operator who was successfully validated. If more than one response was received, processor 302 evaluates each received response to decide what information to send to vehicle 100. For instance, if one response instructs vehicle 100 to be enabled, and another response instructs vehicle 100 to remain or become disabled, processor 302 will decide which action to send to vehicle 100 depending on pre-programmed instructions stored in memory 304. For example, processor 302 may send the first instructions to be received after the notification step of 612. Or, one or more messages may be sent to one or more third parties, possibly including the parties that sent a response to the notification, notifying the third parties of the disparity, and requesting resolution from one party. Alternatively, each response received in step 518 may have an associated indication relating to a relative priority of each third party. In this case, processor 302 simply determines which response comprises the highest priority, and transmits a message to vehicle 100 relating to the information from the third party having the highest priority. Of course, other methods to decide which instructions to send to vehicle 100 could alternatively be used.

In step 616, processor 302 transmits a response to vehicle 100 comprising the instructions and information provided by the one or more third parties using transmitter 310.

In one embodiment, if validation was not successful as determined in step 604, no action is taken by processor 302, as shown in step 618. This may occur in situations where it is not of particular importance to validate a vehicle operator prior to operating vehicle 100.

In another embodiment, processor 302 consults memory 304 to determine an appropriate response to unsuccessful validation, as shown in step 620. Possible responses include controlling one or more electronic or electromechanical devices onboard vehicle 100 so that vehicle 100 becomes or remains in a disabled or impaired state. An impaired state might include only allowing vehicle 100 to travel no greater than a predetermined time, a predetermined speed, a predetermined distance, to select only a subset of available gears, etc. Alternatively, or in addition, a response directed to the vehicle operator who unsuccessfully attempted validation. The response is generally a pre-defined message and may include an explanation pertaining to the failed validation attempt and/or instructions on what to do next. Alternatively, or in addition to the possibilities just mentioned, another possible response is to instruct other vehicle 100 electronic systems to operate. For example, instructions could include sounding a vehicle horn, flashing vehicle lights, including interior or exterior lights, locking or unlocking one or more vehicle doors, and so on. Still another possible response, which may be used in conjunction with the just-described responses includes alerting one or more third parties of the unsuccessful validation. Such third parties might include law enforcement authorities, the owner of vehicle 100, a dispatch center, or any other remote location 102.

In step 622, a response to the validation message is transmitted to vehicle 100 and/or one or more third parties which may include the response to control vehicle functionality and/or other vehicle systems and information, as described above. The response to vehicle 100 is generally different than the response sent to the one or more third parties, but may include information regarding the instructions sent to vehicle 100 to control its functionality. The response to one or more third parties may include any information pertinent to the unsuccessful validation of the vehicle operator, for instance, the unsuccessful identification information, the time of attempted validation, the time of unsuccessful validation, the location of vehicle 100 when the unsuccessful validation or attempted validation has taken place, and so on.

In another embodiment, after an unsuccessful validation in step 604, a notification of the unsuccessful validation is sent by processor 302 using external interface 308, to one or more third parties, such as one or more remote locations 102, as shown in step 624. The notification may contain information related to the unsuccessful validation, such as the identification information used in the attempted validation, the time of attempted validation, the time of the unsuccessful validation, the location of vehicle 100 when an unsuccessful validation occurred or when the attempted validation has taken place, and so on. The notification may, alternatively or in addition, comprise a request to send a response from one or more third parties, pertaining to one or more actions or messages to be transmitted to vehicle 100. This allows a third party, such as a dispatch center associated with vehicle 100, to dictate specific actions to vehicle 100 when an unsuccessful validation notification is received. Such actions may include disabling one or more vehicle subsystems or ECUs necessary to the operation of vehicle 100, among other actions, discussed earlier with respect to step 620.

At a subsequent time to sending the notification in step 624, one or more responses to the notification is received by processor 302 from one or more third parties through interface 308, as shown in step 626. The response(s) generally comprise(s) instructions to vehicle 100 which disable or impair vehicle functionality, control other vehicle systems, such as flashing lights or sounding the vehicle horn. The response(s) may also comprise voice or text messages or other information directed to the vehicle operator who has attempted validation. If more than one response was received, processor 302 evaluates each received response to decide what information to send to vehicle 100. For instance, if one response instructs vehicle 100 to be enabled, and another response instructs vehicle 100 to remain or become disabled, processor 302 will decide which action to send to vehicle 100 depending on pre-programmed instructions stored in memory 304. For example, processor 302 may send the first instructions to be received after the notification step of 624. Or, in the case of disparate instructions, one or more messages may be sent to one or more third parties, possibly including the parties that sent a response to the notification, notifying the third parties of the disparity, and requesting resolution from one party. Alternatively, each response received in step 626 may have an associated indication relating to a relative priority of each third party. In this case, processor 302 simply determines which response comprises the highest priority, and transmits a message to vehicle 100 relating to the information from the third party having the highest priority. Of course, other methods to decide which instructions to send to vehicle 100 could alternatively be used.

In step 628, processor 302 transmits a response to vehicle 100 comprising information as described in step 626.

The previous description of the preferred embodiments is provided to enable any person skilled in the art to make and use the present invention. The various modifications to these embodiments will be readily apparent to those skilled in the art, and the generic principles defined herein may be applied to other embodiments without the use of the inventive faculty. Thus, the present invention is not intended to be limited to the embodiments discussed herein, but is to be accorded the widest scope consistent with the principles and novel features disclosed herein.

We claim:

1. An apparatus at a vehicle location for validating a vehicle operator to operate functions of a vehicle, comprising:
    an input device for obtaining vehicle operator identification information;
    a transceiver for transmitting the vehicle operator identification information to a remote location for a validation and receiving, from the remote location, a reply message;
    a processor for examining the reply message to determine one or more functions of the vehicle that the vehicle operator is validated to operate, wherein the reply message specifies at least one action to he taken to indicate the validation to the vehicle operator, and the one or more functions comprise an impairing operation of the vehicle; and
    means for enabling the one or more functions and the at least one action specified by the reply message.

2. The apparatus of claim 1, wherein the at least one action comprises flashing a headlight of the vehicle.

3. The apparatus of claim 1, wherein the at least one action comprises flashing a tail light of the vehicle.

4. The apparatus of claim 1, wherein the at least one action comprises flashing a vehicle interior light of the vehicle.

5. The apparatus of claim 1, wherein the at least one action comprises sounding a horn of the vehicle.

6. The apparatus of claim 1, wherein the impairing operation of the vehicle comprises preventing the vehicle from starting.

7. The apparatus of claim 1, wherein the impairing operation of the vehicle comprises disabling a vehicle ignition system.

8. The apparatus of claim 1, wherein the one or more functions comprise impairing a fuel system of the vehicle.

9. The apparatus of claim 1, wherein the impairing operation of the vehicle comprises impairing a vehicle transmission.

10. The apparatus of claim 9, wherein impairing the vehicle transmission comprises limiting a number of gears to be used during an operation of the vehicle.

11. An apparatus at a vehicle location for validating a vehicle operator to operate functions of a vehicle, comprising:
   an input device for obtaining vehicle operator identification information;
   a transceiver for transmitting the vehicle operator identification information to a remote location for a validation and receiving, from the remote location, a reply message;
   a processor for examining the reply message to determine one or more functions of the vehicle that the vehicle operator is validated to operate, wherein the reply message specifies at least one action to be taken to indicate the validation to the vehicle operator; and
   means for enabling the one or more functions and the at least one action specified by the reply message, wherein the one or more function are selected from a group consisting of: enabling an operation of the vehicle, specifying a time during which the vehicle is operated, enabling the vehicle to be started, enabling an ignition system of the vehicle, enabling a fuel, system of the vehicle, limiting a number of gears to be used during operation of the vehicle, and establishing a distance over which the vehicle is driven.

12. An apparatus at a vehicle location for validating a vehicle operator to operate functions of a vehicle, comprising:
   an input device for obtaining vehicle operator identification information;
   a transceiver for transmitting a message to a remote location at which one or more vehicle functions are selected based upon the operator identification information, and receiving, from the remote location, a reply message;
   a processor for examining the reply message to determine the one or more vehicle functions that the vehicle operator is validated to operate, wherein the reply message specifies at least one action to be taken to indicate a validation to the vehicle operator, and the one or more vehicle functions comprise an impairing operation of the vehicle; and
   means for enabling the one or more vehicle functions and the at least one action specified by the reply message.

13. The apparatus of claim 12, wherein the at least one action comprises flashing a headlight of the vehicle.

14. The apparatus of claim 12, wherein the at least one action comprises flashing a tail light of the vehicle.

15. The apparatus of claim 12, wherein the at least one action comprises flashing a vehicle interior light of the vehicle.

16. The apparatus of claim 12, wherein the at least one action comprises sounding a horn of the vehicle.

17. The apparatus of claim 12, wherein the impairing operation of the vehicle comprises preventing the vehicle from starting.

18. The apparatus of claim 12, wherein the impairing operation of the vehicle comprises disabling a vehicle ignition system.

19. The apparatus of claim 12, wherein the one or more vehicle functions comprise impairing a fuel system of the vehicle.

20. The apparatus of claim 12, wherein the impairing operation of the vehicle comprises impairing a vehicle transmission.

21. The apparatus of claim 20, wherein the impairing a vehicle transmission comprises limiting a number of gears to be used during an operation of the vehicle.

22. An apparatus at a vehicle location for validating a vehicle operator to operate functions of a vehicle, comprising:
   an input device for obtaining vehicle operator identification information;
   a transceiver for transmitting a message to a remote location at which one or more vehicle functions are selected based upon the operator identification information, and receiving, from the remote location, a reply message;
   a processor for examining the reply message to determine the one or more vehicle functions that the vehicle operator is validated to operate, wherein there reply message specifies at least one action to be taken to indicate a validation to the vehicle operator; and
   means for enabling the one or more vehicle functions and the at least one action specified by the reply message, wherein the one or more vehicle functions are selected from a group consisting of: enabling an operation of the vehicle, specifying a time during which the vehicle is operated, enabling the vehicle to he started, enabling an ignition system of the vehicle, enabling a fuel system of the vehicle, limiting a number of gears to be used during the operation of the vehicle, and establishing a distance over which the vehicle is driven.

23. A method for validating a vehicle operator to operate functions of a vehicle, comprising:
   receiving vehicle operator identification information into a device located at the vehicle;
   transmitting the vehicle operator identification information to a remote location for validation;
   receiving, from the remote location, a reply message;
   examining the reply message to determine one or more functions of the vehicle that the vehicle operator is validated to operate, wherein the reply message specifies at least one action to be taken to indicate a validation to the vehicle operator, and the one or more functions comprise an impairing operation of the vehicle; and
   enabling the one or more functions and the at least one action specified by the reply message.

24. The method of claim 23 wherein the at least one action comprises sounding a horn of the vehicle.

25. The method of claim 23 wherein the at least one action comprises flashing a headlight of the vehicle.

26. The method of claim 23 wherein the at least one action comprises flashing a tail light of the vehicle.

27. The method of claim 23 wherein the at least one action comprises flashing an interior light of the vehicle.

28. The method of claim 23, wherein the impairing operation of the vehicle comprises preventing the vehicle from starting.

29. The method of claim 23, wherein the impairing operation of the vehicle comprises disabling a vehicle ignition system.

30. The method of claim 23, wherein the impairing operation of the vehicle comprises impairing a vehicle fuel system.

31. The method of claim 23, wherein the impairing operation of the vehicle comprises impairing a vehicle transmission.

32. The method of claim 31 wherein impairing the vehicle transmission comprises limiting a number of gears to be used during an operation of the vehicle.

33. A method for validating a vehicle operator to operate functions of a vehicle, comprising:
    receiving vehicle operator identification information into a device located at the vehicle;
    transmitting the vehicle operator identification information to a remote location for a validation;
    receiving from the remote location, a reply message;
    examining the reply message to determine one or more functions of the vehicle that the vehicle operator is validated to operate, wherein the reply message specifies at least one action to he taken to indicate the validation to the vehicle operator; and
    enabling the one or more functions and the at least one action specified by the reply message, wherein the one or more functions are selected from a group consisting of: enabling an operation of the vehicle, specifying a time during which the vehicle is operated, enabling the vehicle to be started, enabling an ignition system of the vehicle, enabling a fuel system of the vehicle, limiting a number of gears to be used during the operation of the vehicle, and establishing a distance over which the vehicle is driven.

34. The apparatus of claim 1, wherein the reply message further specifies at least one message for the vehicle operator.

35. The apparatus of claim 34, wherein the at least one message comprises at least one of a route of travel for the vehicle, an itinerary for the vehicle, and a personal message for the vehicle operator.

36. The apparatus of claim 12, wherein the reply message further specifies at least one message for the vehicle operator.

37. The apparatus of claim 36, wherein the at least one message comprises at least one of a route of travel for the vehicle, an itinerary for the vehicle, and a personal message for the vehicle operator.

38. The method of claim 23, wherein the reply message further specifies at least one message for the vehicle operator.

39. The method of claim 38, wherein the at least one message comprises at least one of a route of travel for the vehicle, an itinerary for the vehicle, and a personal message for the vehicle operator.

40. An apparatus for validating, at a remote location, a vehicle operator to operate functions of a vehicle, comprising:
    a transceiver configured to receive identification information of the vehicle operator, and transmit a reply message to the vehicle; and
    a processor configured to:
        validate the vehicle operator based on the identification information,
        determine at the remote location, based on the identification information, one or more functions of the vehicle that the vehicle operator is validated to operate, wherein the one or more functions comprises an impairing operation of the vehicle,
        generate the reply message that specifies the one or more functions,
        generate a notification of a validation, and
        transmit the notification to a third party.

41. A method for validating, at a remote location, a vehicle operator to operate functions of a vehicle, comprising:
    receiving identification information of the vehicle operator;
    validating the vehicle operator based on the identification information;
    determining at the remote location, based on the identification information, one or more functions of the vehicle that the vehicle operator is validated to operate, wherein the one or more functions comprises an impairing operation of the vehicle;
    generating a reply message that specifies the one or more functions;
    transmitting the reply message to the vehicle; and
    generating a notification of a validation for a third party.

42. An apparatus at a vehicle location for validating a vehicle operator to operate functions of a vehicle, comprising:
    means for obtaining vehicle operator identification information;
    means for transmitting the vehicle operator identification information to a remote location for a validation and means for receiving, from the remote location, a reply message;
    means for examining the reply message to determine one or more functions of the vehicle that the vehicle operator is validated to operate, wherein the reply message specifies at least one action to be taken to indicate the validation to the vehicle operator, and the one or more functions comprise an impairing operation of the vehicle; and
    means for enabling the one or more functions and the at least one action specified by the reply message.

43. An apparatus at a vehicle location for validating a vehicle operator to operate functions of a vehicle, comprising:
    means for obtaining vehicle operator identification information;
    means for transmitting the vehicle operator identification information to a remote location for a validation and means for receiving from the remote location, a reply message;
    means for examining the reply message to determine one or more functions of the vehicle that the operator is validated to operate, wherein the reply message specifies at least one action to be taken to indicate the validation to the vehicle operator; and
    means for enabling the one or more functions and the at least one action specified by the reply message, wherein the one or more function are selected from a group consisting of: enabling an operation of the vehicle, specifying a time during which the vehicle is operated, enabling the vehicle to be started, enabling an ignition system of the vehicle, enabling a fuel system of the vehicle, limiting a number of gears to be used during the operation of the vehicle, and establishing a distance over which the vehicle is driven.

44. A computer program product, comprising:
    a computer-readable medium comprising:
        code for causing at least one computer to enter vehicle operator identification information;

code for causing the least one computer to transmit the vehicle operator identification information to a remote location for a validation and to receive, from the remote location, a reply message;

code for causing the least one computer to examine the reply message to determine one or more functions of the vehicle that the vehicle operator is validated to operate, wherein the reply message specifies at least one action to be taken to indicate the validation to the vehicle operator, and the one or more functions comprise, an impairing operation of the vehicle; and code for causing the least one computer to enable the one or more functions and the at least one action specified by the reply message.

45. A computer program product, comprising:
a computer-readable medium comprising:
codes for causing at least one computer to:
  enter vehicle operator identification information;
  transmit the vehicle operator identification information to a remote location for a validation and receive, from the remote location, a reply message;
  examine the reply message to determine one or more functions of the vehicle that the vehicle operator is validated to operate, wherein the reply message specifies at least one action to be taken to indicate the validation to the vehicle operator; and
  enable the one or more functions and the at least one action specified by the reply message, wherein the one or more function are selected from a group consisting of enabling an operation of the vehicle, specifying a time during which the vehicle is operated, enabling the vehicle to be started, enabling an ignition system of the vehicle, enabling a fuel system of the vehicle, limiting a number of gears to be used during the operation of the vehicle, and establishing a distance over which the vehicle is driven.

46. An apparatus for validating, at a remote location, a vehicle operator to operate functions of a vehicle, comprising:
  means for receiving identification information of the vehicle operator, and means for transmitting a reply message to the vehicle;
  means for validating the vehicle operator based on the identification information;
  means for determining at the remote location, based on the identification information, one or more functions of the vehicle that the vehicle operator is validated to operate, wherein the one or more functions comprises an impairing operation of the vehicle;
  means for generating the reply message that specifies the one or more functions;
  means for generating a notification of a validation; and
  means for transmitting the notification to a third party.

47. A computer program product, comprising:
a computer-readable medium comprising:
code for causing at least one computer to:
  receive identification information of the vehicle operator;
  transmit a reply message to the vehicle;
  validate the vehicle operator based on the identification information;
  determine at the remote location, based on the identification information, one or more functions of the vehicle that the vehicle operator is validated to operate, wherein the one or more functions comprises an impairing operation of the vehicle;
  generate the reply message that specifies the one or more functions;
  generate a notification of a validation; and
  transmit the notification to a third party.

48. A method for validating a vehicle operator to operate functions of a vehicle, comprising:
  obtaining vehicle operator identification information;
  transmitting a message to a remote location at which one or more vehicle functions are selected based upon the operator identification information;
  receiving, from the remote location, a reply message;
  examining the reply message to determine the one or more vehicle functions that the vehicle operator is validated to operate, wherein the reply message specifies at least one action to be taken to indicate a validation to the vehicle operator, and the one or more vehicle functions comprise an impairing operation of the vehicle; and
  enabling the one or more vehicle functions and the at least one action specified by the reply message.

49. An apparatus for validating a vehicle operator to operate functions of a vehicle, comprising:
  means for obtaining vehicle operator identification information;
  means for transmitting a message to a remote location at which one or more vehicle functions are selected based upon the operator identification information;
  means for receiving, from the remote location, a reply message;
  means for examining the reply message to determine the one or more vehicle functions that the vehicle operator is validated to operate, wherein the reply message specifies at least one action to be taken to indicate a validation to the vehicle operator, and the one or more vehicle functions comprise an impairing operation of the vehicle; and
  means for enabling the one or more vehicle functions and the at least one action specified by the reply message.

50. A computer program product for validating a vehicle operator to operate functions of a vehicle, comprising:
a computer-readable medium, comprising:
codes for causing at least one computer to:
  obtain vehicle operator identification information;
  transmit a message to a remote location at which one or more vehicle functions are selected based upon the operator identification information;
  receive, from the remote location, a reply message;
  examine the reply message to determine the one or more vehicle functions that the vehicle operator is validated to operate, wherein the reply message specifies at least one action to be taken to indicate a validation to the vehicle operator, and the one or more vehicle functions comprise an impairing operation of the vehicle; and
  enable the one or more vehicle functions and the at least one action specified by the reply message.

* * * * *